United States Patent Office 2,766,682
Patented Oct. 16, 1956

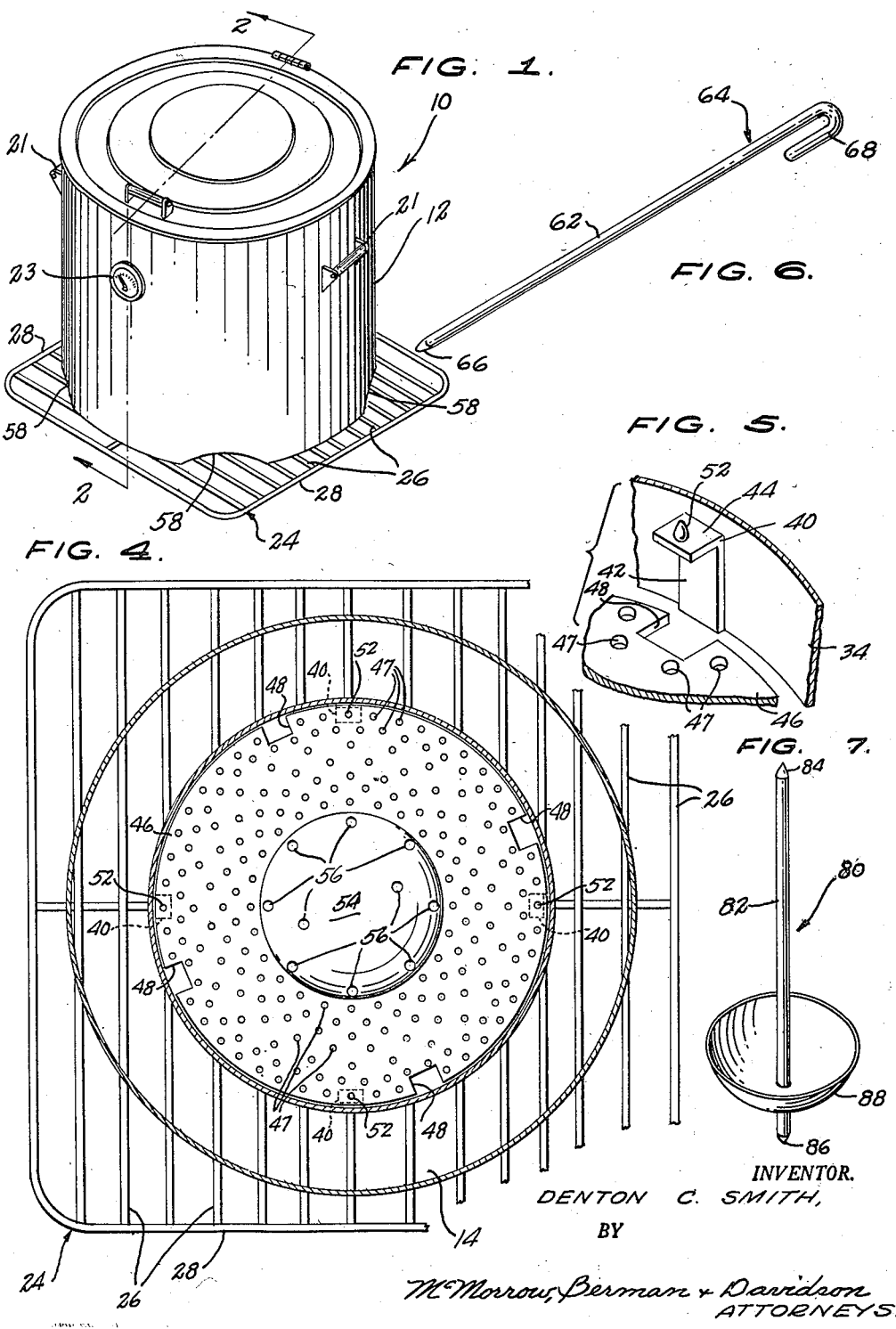

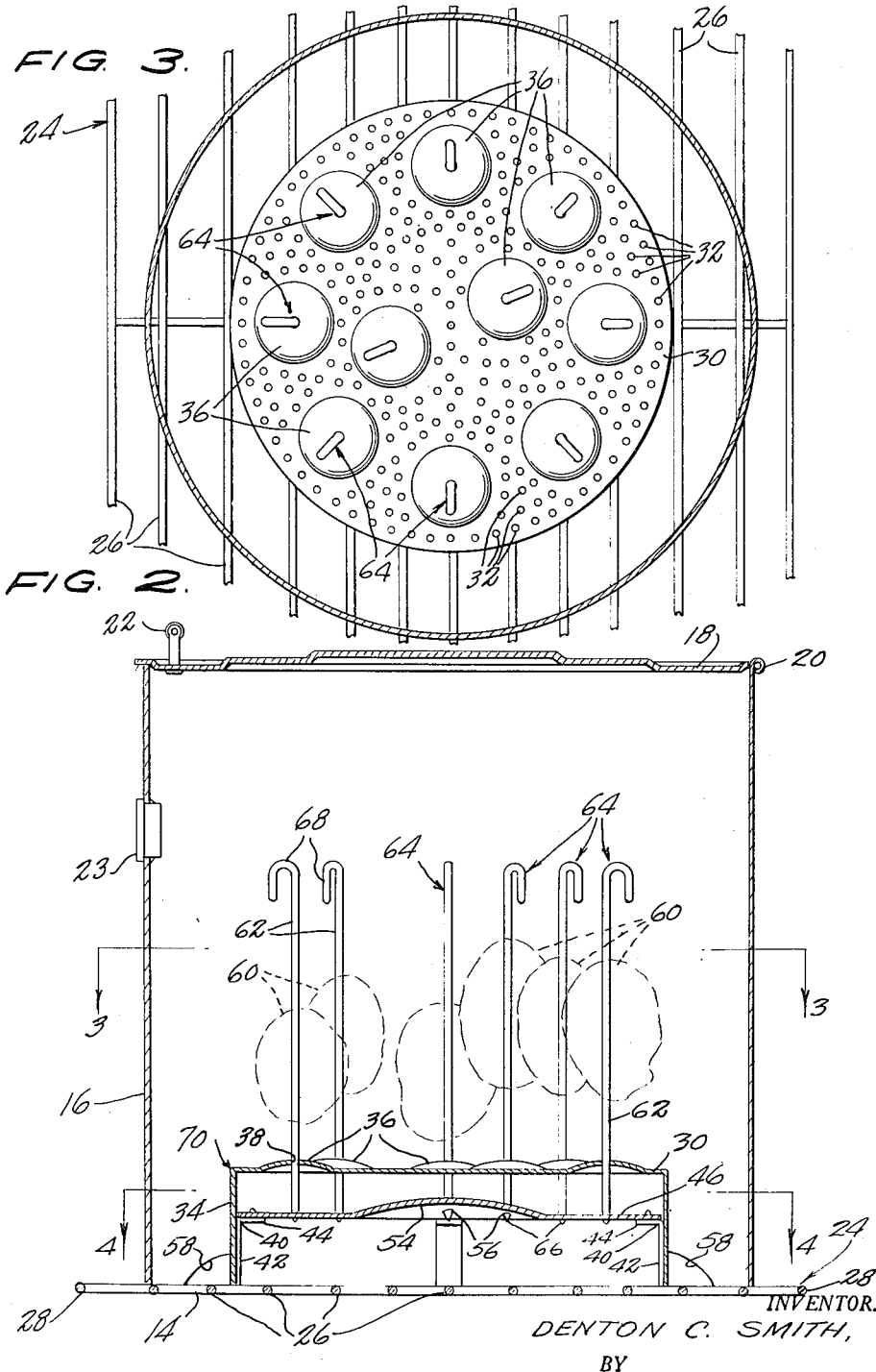

2,766,682

COOKING VESSEL

Denton C. Smith, Asheville, N. C.

Application May 6, 1955, Serial No. 506,557

4 Claims. (Cl. 99—419)

This invention relates to cooking vessels and more particularly to vegetable bakers.

It is an object of this invention to provide a baking vessel for various kinds of vegetables embodying a number of readily separable parts which can be quickly assembled for use and disassembled for cleaning.

Another object is to provide a baking vessel which will thoroughly and economically bake potatoes, sweet potatoes, squash and other bulky vegetables, and in which the heat applied to the vessel is conducted to the insides of the vegetables without overcooking the outer portions thereof, not possible with conventional oven methods, and at the same time maintaining the vegetables being cooked out of direct contact with the source of heat.

Still another object is to provide a baking vessel which is of compact construction and occupies a minimum of space while being capable of holding a large number of the bulky vegetables to be baked therein.

Other objects and advantages will become apparent from a consideration of the following detailed description, forming the specification, and taken in conjunction with the accompanying drawings, in which:

Figure 1 is a perspective view of baking vessel embodying this invention;

Figure 2 is an enlarged vertical cross sectional view taken along line 2—2 of Figure 1;

Figure 3 is a transverse cross sectional view taken along line 3—3 of Figure 2;

Figure 4 is a transverse cross sectional view taken along line 4—4 of Figure 2;

Figure 5 is a fragmentary perspective view of a portion of the baking vessel;

Figure 6 is a perspective view of one of the vegetable skewers or spits; and

Figure 7 is a perspective view of a modified form of spit.

With continued reference to the drawings, the illustrated baking vessel, generally designated 10, comprises a cylindrical casing 12 having a cylindrical side wall 16 open at both the top and bottom. A cover 18 is hingably mounted on the side wall 16, as at 20, to move into sealing engagement with open top of the casing by its own weight. The cover 18 carries a handle 22 upstanding therefrom whereby the cover can be moved about the hinge 20 into and out of closing relation with the open top of the casing. The side wall 16 carries a pair of external diametrically opposed carrying handles 21 and a heat indicating gauge 23.

A wire rack, generally indicated at 24, comprises a generally rectangular wire frame 28 with wire rods 26 extending transversely thereacross in equally spaced, parallel relation. The rack 24 is secured to the lower edge of the side wall 16 to extend across the open bottom 14 thereof and be carried by the casing 12.

Disposed within the casing 10 is a circular inverted, pan-shaped housing, comprising a plate 31 having a plurality of spaced perforations 32 and a cylindrical skirt 34 formed integrally therewith and depending therefrom about its periphery whose lower edge rests upon the wire rack 24, the housing 30 being concentrically spaced from the side wall 16, as shown in Figure 2.

The plate 31 of the housing 30 has a plurality of spaced dome-shaped protuberances 36 formed therein with the convex surfaces of the protuberances projecting above the upper flat surface of the plate 31. Each of the protuberances has a central opening 38.

Secured to the inner surface of the skirt 34 is a plurality of inverted L-shaped brackets 40 in equally spaced angular relation thereabout, the vertical legs 42 being secured to the skirt and the horizontal legs 44 extending radially inwardly into the interior of the housing 30.

A circular perforated disc 46 having a diameter slightly less than the interior diameter of the skirt 34 is supported upon the legs 44 of the brackets 40, as shown in Figure 2. The disc 46 is provided with a plurality of equally angularly spaced notches 48, equal in number to and similarly spaced as the brackets 40, opening through the periphery thereof. To place the disc 46 within the housing 30 to be supported in parallel relation to and below the plate 31, the disc is moved upwardly through the open bottom of the housing with the notches 48 aligned with the brackets 40. This will permit the legs 44 of the brackets to clear through the notches 48 as the disc is moved upwardly. As shown in Figure 5, the disc 46 has a plurality of the spaced perforations 47 adjacent each of the notches 48, to selectively engage over an upstanding prong 52 on each of the bracket legs 44 to releasably mount the disc on the skirt 34.

A central dome 54 is formed in the disc 46 with the convex portion thereof extending above the upper surface of the disc, as seen in Figure 2. A plurality of spaced small apertures 56 are formed through the dome 54.

The lower edge 14 of the side wall 16 of the casing 12 has a plurality of angularly spaced arcuate cutout portions 58 to define vents for releasing surplus heat from the source of heat over which the vessel 10 is placed.

Large vegetables, such as potatoes 60, are transfixed upon the shanks 62 of skewers or spits, generally indicated at 64, so as to be disposed between their lower pointed ends 66 and hook handles 68 on their upper ends.

Thus, the vegetables on the skewers are subjected to the heat rising through the bottom of the casing 12 and into the housing 30 and transmitted by conduction through the heat conductive metal material of the skewers into the insides of the vegetables. Hence, the vegetables will be baked evenly both inside and outside. Also, since the vegetables do not touch the casing or the housing, danger of burning the vegetables is avoided.

In Figure 7, there is shown a modified form of a skewer or spit, generally indicated at 80, especially adapted for baking vegetables such as summer squash in the vessel 10. The skewer 80 comprises a straight shaft or shank 82 having pointed upper and lower ends 84 and 86. A cup 88 is secured to the shaft 82 adjacent the lower end 86 with the shaft passing centrally therethrough with the open end of the cup facing upwardly. The cup serves as an additional support for a vegetable impaled upon the shaft 82 as well as being a well for catching any of the juices discharged from the vegetable during the baking process.

That portion of the skewer shaft 82 extending above the cup 82 is adapted to be engaged through one of the openings 38 in the plate 31 of the housing 30 and engaged in an aligned aperture 56 or perforation 47 in the dome 54 of the disc 46 to function in a manner similar to the skewers 62.

While there is shown and described the preferred embodiment of the invention, it is to be understood that the structure is susceptible to change and modification within the practicability of the invention and therefore should be limited only by the scope of the claims appended hereto.

What is claimed is:

1. In a vegetable baker, an open rack, a vertical casing on said rack having open upper and lower ends, a cover closing said upper end, said casing having a side wall having a lower edge resting upon said rack, an inverted pan-shaped housing on said rack within and smaller in diameter than said casing and concentrically spaced from the casing side wall, said housing comprising a perforated plate and a peripheral skirt depending from said plate, said skirt having a lower edge resting upon said rack, a perforated disc within said housing, support means acting between said skirt and said disc and supporting said disc below said housing plate and above the lower edge of the skirt, said housing plate having spaced openings therein, and vertical spits comprising shanks having upper ends and lower ends, said shanks having lower portions engaged through said openings and supportably bearing upon said disc with the upper ends of the shanks extending above said housing.

2. In a vegetable baker, an open rack, a vertical casing on said rack having open upper and lower ends, a cover closing said upper end, said casing having a side wall having a lower edge resting upon said rack, an inverted pan-shaped housing on said rack within and smaller in diameter than said casing and concentrically spaced from the casing side wall, said housing comprising a perforated plate and a peripheral skirt depending from said plate, said skirt having a lower edge resting upon said rack, a perforated disc within said housing, support means acting between said skirt and said disc and supporting said disc below said housing plate and above the lower edge of the skirt, said housing plate having spaced openings therein, and vertical spits comprising shanks having upper ends and lower ends, said shanks having lower portions engaged through said openings and supportably bearing upon said disc with the upper ends of the shanks extending above said housing, said housing being downwardly spaced from the upper end of the casing with the upper ends of the spits spaced downwardly from the casing cover.

3. In a vegetable baker, an open rack, a vertical casing on said rack having open upper and lower ends, a cover closing said upper end, said casing having a side wall having a lower edge resting upon said rack, an inverted pan-shaped housing on said rack within and smaller in diameter than said casing and concentrically spaced from the casing side wall, said housing comprising a perforated plate and a peripheral skirt depending from said plate, said skirt having a lower edge resting upon said rack, a perforated disc within said housing, support means acting between said skirt and said disc and supporting said disc below said housing plate and above the lower edge of the skirt, said housing plate having spaced openings therein, and vertical spits comprising shanks having upper ends and lower ends, said shanks having lower portions engaged through said openings and supportably bearing upon said disc with the upper ends of the shanks extending above said housing, the housing skirt being imperforate and said support means comprising brackets secured to said skirt and having legs projecting radially inwardly from said skirt upon which said disc rests.

4. In a vegetable baker, an open rack, a vertical casing on said rack having open upper and lower ends, a cover closing said upper end, said casing having a side wall having a lower edge resting upon said rack, an inverted pan-shaped housing on said rack within and smaller in diameter than said casing and concentrically spaced from the casing side wall, said housing comprising a perforated plate and a peripheral skirt depending from said plate, said skirt having a lower edge resting upon said rack, a perforated disc within said housing, support means acting between said skirt and said disc and supporting said disc below said housing plate and above the lower edge of the skirt, said housing plate having spaced openings therein, and vertical spits comprising shanks having upper ends and lower ends, said shanks having lower portions engaged through said openings and supportably bearing upon said disc with the upper ends of the shanks extending above said housing, the housing skirt being imperforate and said support means comprising brackets secured to said skirt and having legs projecting radially inwardly from said skirt upon which said disc rests, said disc being rotatably supported and having peripheral notches adapted to be registered with and to clear said legs for removal of the disc from the housing.

References Cited in the file of this patent

UNITED STATES PATENTS

| | | |
|---|---|---|
| 1,935,831 | Cunningham | Nov. 21, 1933 |
| 1,969,601 | Foch | Aug. 7, 1934 |

FOREIGN PATENTS

| | | |
|---|---|---|
| 526,607 | France | July 6, 1921 |